US00RE35534E

United States Patent [19]

Claytor

[11] E Patent Number: Re. 35,534

[45] Reissued Date of Patent: Jun. 17, 1997

[54] FRESNEL LENS WITH ASPHERIC GROOVES

[75] Inventor: Richard N. Claytor, Arlington, Tex.

[73] Assignee: Fresnel Technologies Inc., Ft. Worth, Tex.

[21] Appl. No.: 228,115

[22] Filed: Apr. 15, 1994

Related U.S. Patent Documents

Reissue of:

[64] Patent No.: 4,787,722
Issued: Nov. 29, 1988
Appl. No.: 850,256
Filed: Apr. 10, 1986

[51] Int. Cl.[6] ..... G02B 3/08; G02B 13/18

[52] U.S. Cl. ..... 359/742; 359/708

[58] Field of Search ..... 359/742, 743, 359/708

[56] References Cited

U.S. PATENT DOCUMENTS

| | | | |
|---|---|---|---|
| 2,736,894 | 2/1956 | Kock | 343/753 |
| 2,931,913 | 5/1960 | Long | 250/237 R |
| 3,203,306 | 8/1965 | Lefferts | 359/742 |
| 3,390,399 | 6/1968 | Leonard | 359/742 |
| 3,703,718 | 11/1972 | Berman | 359/853 |
| 3,743,385 | 7/1973 | Schaefer | 359/742 |
| 3,839,640 | 10/1974 | Rossin | 250/353 |
| 3,991,741 | 11/1976 | Northrup, Jr. et al. | 359/710 |
| 4,087,688 | 5/1978 | Keller | 250/353 |
| 4,115,701 | 9/1978 | Guichard | 250/353 |
| 4,204,881 | 5/1980 | McGreen | 359/742 |
| 4,210,391 | 7/1980 | Cohen | 359/743 |
| 4,293,196 | 10/1981 | Hilbert | 359/743 |
| 4,321,594 | 3/1982 | Galvin et al. | 359/356 |
| 4,340,283 | 7/1982 | Cohen | 359/743 |
| 4,391,495 | 7/1983 | Mazurkewitz | 359/742 |
| 4,535,240 | 8/1985 | Vigurs | 359/742 |
| 4,717,821 | 1/1988 | Messiou | 250/353 |

OTHER PUBLICATIONS

"The Atlas of Near Infrared Spectra," by Sadtler (7 pages).

"The Infrared Spectra Atlas of Monomers and Polymers," by Sadtler (6 pages).

"An Infrared Spectroscopy Atlas for the Coatings Industry," by The Infrared Spectroscopy Committee of the Chicago Society for Coatings, (Preface) and p. 27 of Chapter V: Qualitative Analysis.

"Design and Construction of Fresnel Optics for Photoelectric Receivers," by E.A. Boettner and N.E. Barnett, Journal of the Optical Society of America, Nov., 1951, pp. 849–857.

"Optics", by Arnold Sommerfield, (1954) pp. 216–220.

"Physical Optics", by Robert W. Wood, 1961, pp. 33–39.

"The Phase Fresnel Lens," by Kenro Miyamoto, Journal of the Optical Society of America, Jan., 1961, vol. 51, pp. 17–20.

"Optical Production Technology," by D.F. Horne, 1972, p. 257.

"Fundamentals of Optics," by Francis A. Jenkins and Harvey E. White, 1976, Chapter 18: Fresnel Diffraction, pp. 378–386.

"Fresnel Lenses for Infrared Wavelengths," Lectric Lites Co. 1980.

Electro–Optical Systems Design, vol. 14, No. 2, Feb. 1982, pp. 47–51.

Modern Dictionary of Electronics, by Rudolf F. Graf, 1984, p. 409.

(List continued on next page.)

*Primary Examiner*—Scott J. Sugarman
*Attorney, Agent, or Firm*—James E. Bradley

[57] ABSTRACT

A Fresnel lens formed of an infrared transmitting material has a grooved surface. The grooves all extend to the same depth, and the distances between successive grooves vary across the lens. In a circular lens, the grooves are concentric, and the distances between grooves nearer the center are longer than the distances between the grooves nearer the circumference. A substantial portion of the grooves have an aspherical surface.

5 Claims, 2 Drawing Sheets

OTHER PUBLICATIONS

Pyrex® Glass Code 7740, Material Properties, Graphs: Infrared Transmittance and Full Spectrum Transmittance.
Long–wave Optics, by George W. Chantry, vol. 1, 1984, pp. 1–9, 20–24.
"Fresnel Lens for Movement Sensing," Amperex Electronic Corporation, Apr., 1985.
"Design and Manufacture of high Quality Plastic Infrared Fresnel Lenses," by G. Bradburn, SPIE vol. 590 Infrared Technology and Applications (1985), pp. 87–92.
Optics, by Eugene Hecht, 1987, pp.445–447.

"Optical Materials: Transmission and Refractive Index," The Photonics Design and Application Handbook, 1988, H–286–287.

"Modern Optics," Earle B. Brown, 1965, pp. 104–106, 273–277, 278–284, 339–341.

1.8 Foot Focal Length Lens, 15 Foot Focal Lens and 1.35" LODIFF™ Lens, Grooves Out Molded in PolyIR®2 0.015".

FRESNEL LENS WITH ASPHERIC GROOVES

Matter enclosed in heavy brackets [ ] appears in the original patent but forms no part of this reissue specification; matter printed in italics indicates the additions made by reissue.

BACKGROUND OF THE INVENTION

1. Field of the Invention

This invention relates in general to the field of optics, and more particularly to Fresnel lenses.

2. Description of the Prior Art

In 1748, Count Buffon proposed to grind out of a solid piece of glass a lens in steps or concentric zones, in order to reduce the thickness of the lens to a minimum. In 1822, Augustin Fresnel, for whom the Fresnel lens is named, constructed a lens in which the centers of curvature of the different rings receded from the axis according to their distances from the center, so as to practically eliminate spherical aberration.

Modern Fresnel lenses are used as light condensers, illuminators, and magnifiers, and in many other ways. Fresnel lenses basically consist of a series of concentric prismatic grooves, designed to cooperatively direct incident light rays to a common focus. This type of lens is thin, lightweight, and of high aperture. Also, this type of lens can be accurately mass-produced using replication techniques.

Generally, in prior art thin Fresnel lenses intended for visible light applications, the grooves are all the same width, so that the groove density is constant across the lens. The depth of the grooves increases as the distance between the groove and the center of the lens increases. The depth of the deepest groove places a limit on the minimum thickness of the lens. Therefore, if the depth of the grooves can be reduced, the thickness of the lens can be reduced.

One method of reducing groove depth is to increase groove density i.e., the number of grooves between the center of the lens and a given radius. However, diffraction effects limits the improvements which can be made in this way. Diffraction effects are especially strong in Fresnel lenses for infrared wavelengths, because the wavelength approaches the groove spacing.

Fresnel lenses are particularly useful with infrared energy rays. Such infrared rays are used in passive infrared burglar alarms, noncontacting thermometers, proximity detectors, and other devices. Lenses for collecting such infrared rays can be made of rather perfect, but expensive materials, such as germanium, but a desire to reduce costs often dictates cheaper, lossy materials, such as plastics. Lenses made from such materials must be very thin, or too much of the incident energy will be attenuated in passing through the lens. The shape of a conventional positive focal length lens is such that the center, the most ideal portion optically, is also the thickest portion. The Fresnel lens concept allows lenses to be made very thin, and adequately uniform in thickness from center to edge.

SUMMARY OF THE INVENTION

The Fresnel lens of the invention has a body with a grooved surface. The grooved surface has a plurality of grooves, which all extend to the same depth. Each groove surface has an aspheric contour, and all of the grooves together approximate an aspheric surface, as well. The distances between successive grooves vary, so that the groove density varies across the lens. Since all of the grooves extend to the same depth, the lens can be made very thin, while still retaining a reasonably large groove density, and hence an acceptable level of losses due to diffraction effects, especially toward the optical center of the lens.

Plastic materials best suited for use in the infrared, such as polyethylene, are poor lens materials. Hovever, because the Fresnel lens of the invention can be made very thin, yet retain other desirable characteristics in the infrared, such as complete elimination of spherical aberration and an acceptable level of diffraction effects, the use of the lossy plastic materials in the infrared became practical.

The present method of making the Fresnel lens of the invention or the molds to produce the Fresnel lens of the invention requires a process in which the point of a sharply pointed cutting tool is used to cut the surface. Because of the requirement for extremely small grooves which results from the need to make the lens thin, the cutting tool must be sharp indeed, with a radius of perhaps 0.0001 inch. Contoured surfaces produced in this manner inevitably have a poor surface finish because of tool marks, and are not acceptable for visible light applications. However, for infrared applications the surface finish of the lens is far less critical.

The grooves in the lens of the invention have aspherical surfaces. The exact contour of the groove surfaces is determined by the particular application of the lens.

DESCRIPTION OF THE PREFERRED EMBODIMENT

Figure 1:
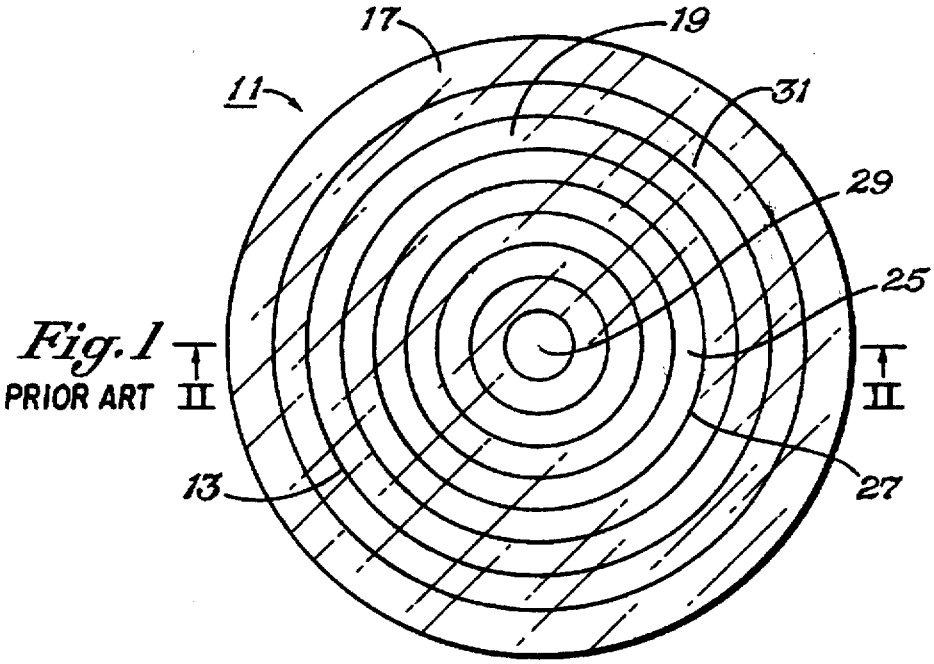
Fig. 1 PRIOR ART
FIG. 1 is a plan view of a prior art Fresnel lens.
Figure 2:
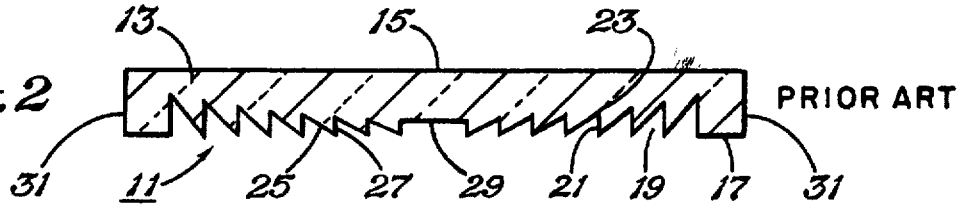
FIG. 2 is a sectional view of a prior art Fresnel lens, as seen along lines II—II in FIG. 1.

A prior art Fresnel lens 11 is shown in FIGS. 1 and 2. The lens 11 has a thin circular body 13. One surface 15 of the body 13 is flat. The other surface 17 has a plurality of concentric grooves 19. Other types of prior art lenses have grooves on both sides.

Each groove 19 is triangular in cross section, as shown in FIG. 2. Each groove 19 has a side 21, which extends from the surface 17 of the lens 11 to an innermost point 23. Each groove 19 also has a surface 25, which angles from the innermost point 23 of the groove 19 to the surface 17 of the lens 11. The outermost point 27 of the surface 25 of each groove 19 coincides with the outermost point 27 of the vertical side 21 of the next groove 19. The surfaces 25 may be flat, thus forming frusto-conical surfaces, but other shapes may also be used.

The width of each groove 19, which is the horizontal distance between the each pair of successive vertical sides 21, is constant. The depth of each groove 19, which is the length of the vertical side 21, increases as the distance between the vertical side 21 and the center 29 of the lens 11 increases. Therefore, the grooves 19 which are closer to the center 29 of the lens 11 are shallower than the grooves 19 which are closer to the circumference 31 of the lens 11.

Since thin prior art Fresnel lenses were specifically made for visible light applications, the surface finish of each groove surface 25 was very important. The groove was therefore cut with the flat surface of a highly-polished diamond cutting tool, to minimize and average out tool marks. Even when spherically contoured groove surfaces 25 were made, they were made with a speciallly formed diamond tool with a curved cutting edge. Furthermore, in the prior art, Fresnel lenses for infrared applications were made using molds cut for visible light applications.

Figure 3:
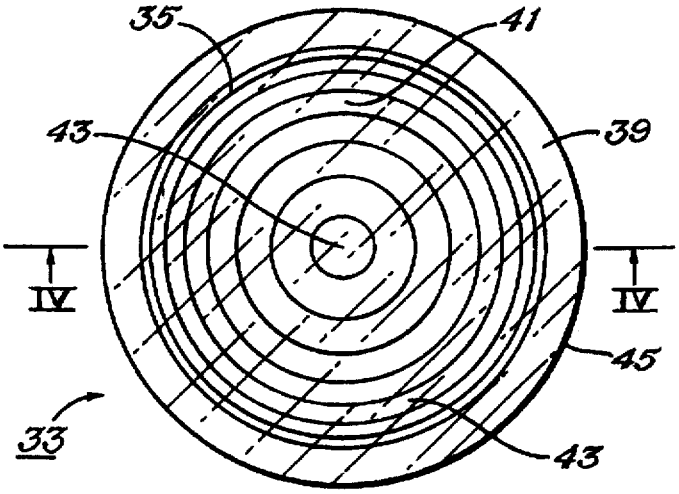
FIG. 3 is a plan view of a Fresnel lens according to the invention.
Figure 4:
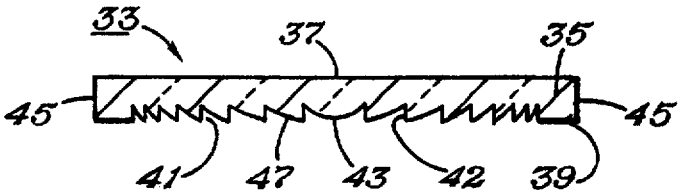
FIG. 4 is a sectional view of a Fresnel lens according to the invention, as seen along line IV—IV in FIG. 3.

The lens 33 of the invention is shown in FIGS. 3 and 4. This lens 33 is preferably made of an infrared-transmitting plastic, such as polyethylene, and has a thin circular body 35, with a flat surface 37 and a grooved surface 39. However, the grooves 41 are of a constant depth and a varying width. The width of each groove 41, which is the horizontal distance between each pair of successive vertical sides 42, decreases as the distance between the groove 41 and the center 43 of the lens 33 increases. Thus, the grooves 41 nearer the center 43 of the lens 33 are wide than the grooves 41 nearer the circumference 45 of the lens 33.

Figure 5:
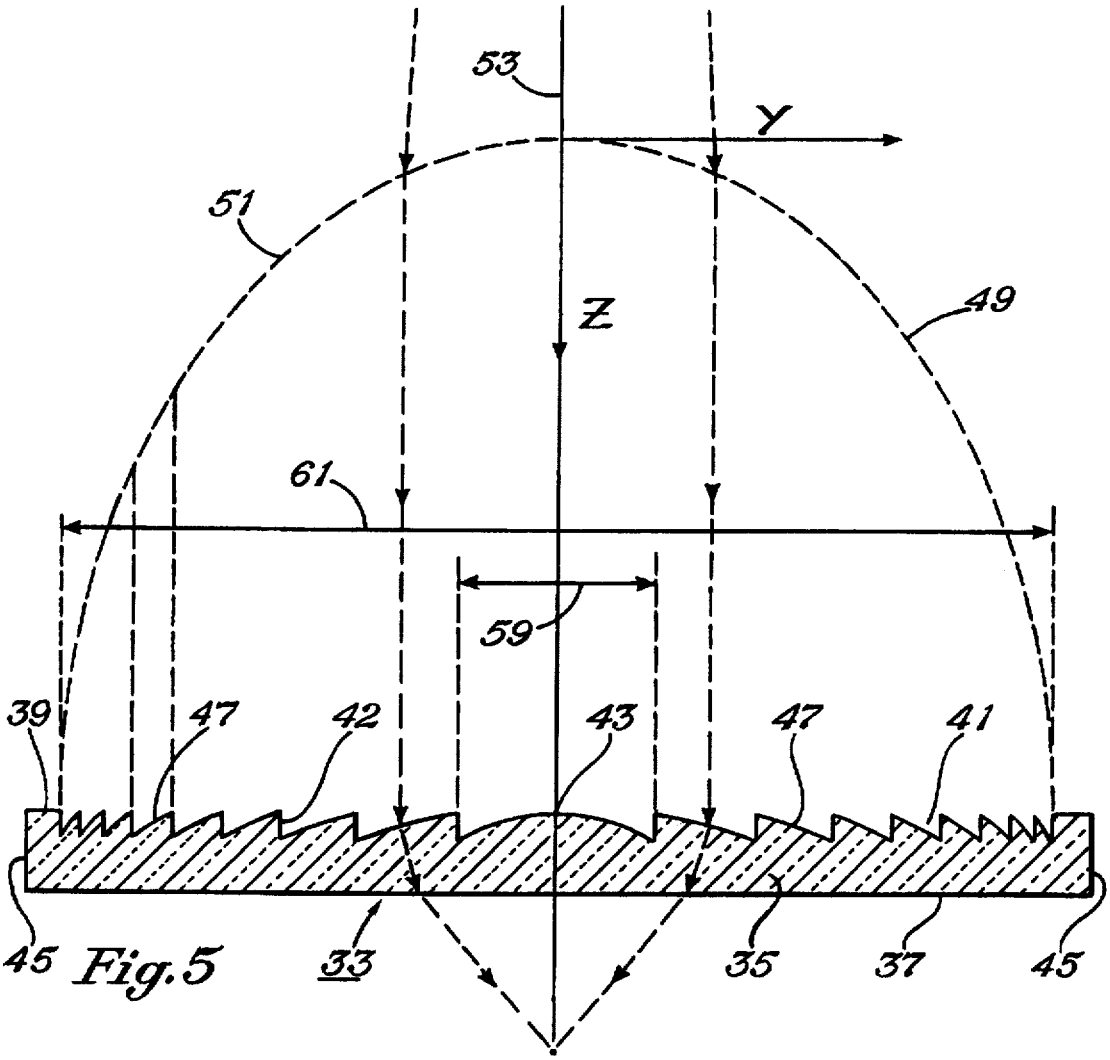
FIG. 5 is a sectional view of a Fresnel lens.

The surface 47 of each groove 41 is contoured, rather than flat. One method of describing the contours of the grooves is derived from the representation of the Fresnel lens as a conventional continuous surface lens that has been collapsed to a thin element of relatively uniform thickness, as shown in FIG. 5. The contour of each groove 41 is roughly equal to the contour of the section 49 of the continuous surface 51 directly above groove 41. There is a correction, which can be substantial, to account for the distance the lens surface corresponding to each groove is moved either toward or away from the focus. There may also be a slight correction caused by the thickness of the Fresnel lens; it is similar to the same correction applied to conventional lenses, but modified slightly because of the shorter path through the lens.

Figure 6:
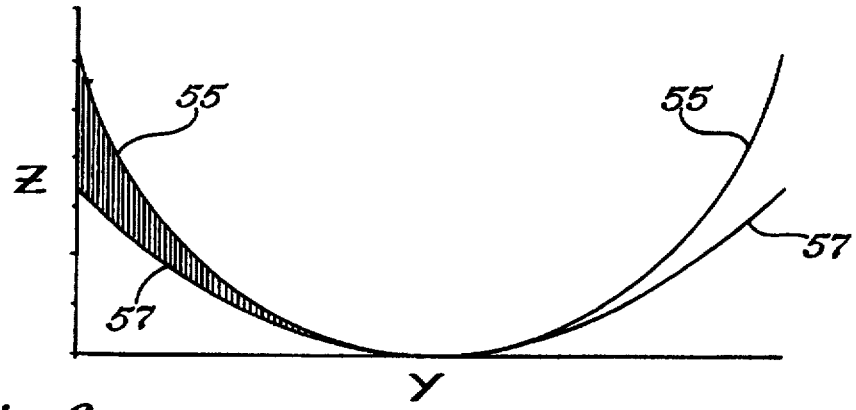
FIG. 6 is a graphic representation of a spherical curve and an aspherical curve.

It is known in the art that a spherical surface on a lens will produce spherical aberration. Therefore, the continuous surface from which the contours of the grooves are determined should not be spherical, but aspherical. FIG. 6 plots "sag" on the z-axis, which is the optic axis 53 in FIG. 5, as a function of the distance across the lens 33, which is plotted on the y-axis. The difference between the spherical curve 57 and an aspherical curve 55 is shown in FIG. 6.

The profile of a continuous aspheric surface 51 can often be closely described by the standard equation of a conic, axially symmetric about the z-axis. That equation is:

$$Z = \frac{CY^2}{1 + (1 - (K+1)C^2Y^2)^{1/2}}$$

where Z and Y are the coordinates of the surface, C is the vertex curvature, and K is the conic constant. The vertex curvature and the conic constant can be chosen depending upon the desired characteristics of the lens, and the contours of each groove can be figured using this equation. The particular vertex curvature and conic constant will depend upon several factors, such as the desired focal length and the index of refraction, and the application in which the lens will be used.

The concept of the Fresnel lens allows an aspherical lens to be made very thin. However, the grooves 47 in a Fresnel lens 33 introduce a scattering effect and refract some of the rays in undesired directions. Therefore, it is preferable that the grooves 47 near the center 43 of the lens 33 be as large as possible.

The Fresnel lens of the invention has several advantages over the prior art. Since the grooves are all the same depth, the thickness of the lens is minimized. This makes it possible to make lenses for infrared applications out of a relatively inexpensive, infrared-transmitting material, such as polyethylene.

The method presently used to produce the contoured aspheric surface uses a pointed diamond tool. Typical grooves toward the outer edge of the Fresnel lens of the invention may have a depth of 0.005 inch and a width of 0.003 inch. In order to contour such a groove faithfully, the diamond tool must have a point radius of 0.0001 inch or so. Countouring with a point this small will inevitably result in tool marks which render the surface quality of the Fresnel lens of the invention unacceptable for visible light applications. However, the Fresnel lens of the invention is acceptable for infrared use, for example in the range of 8 to 14 micrometer wavelength, where surface finish is not so critical.

There may be circumstances in which the required image quality does not require complete faithfulness to the chosen aspheric contour for all of the grooves, specifically, those toward the outer edge of the lens. As the distance from the lens center increases, the groove width decreases, and the difference between the aspheric contour and a spherical contour (or the frustum of cone, for that matter) becomes smaller. At some point, the difference may have a sufficiently trivial impact on image quality as to render the aspheric contour irrelevant. At and beyond this point, the groove contour need not be aspherical. In all cases, however, a substantial portion of the grooves will each individually have an aspherical contour. The contour of each groove differs from the contour of the other grooves.

The invention thus results in a reduction in aberration, attenuation, diffraction, and scattering in infrared energy rays over that of Fresnel lenses of the prior art.

The invention has been shown only in its preferred embodiment. It should be apparent to those skilled in the art that the invention is not so limited, but is susceptible to various changes and modifications without departing from the spirit thereof.

In some applications, the preferred embodiment of the invention will not be a circular lens. For some applications the grooves will be circular, but the lens will be rectangular. Also, the innermost of the concentric grooves may not be located in the center of the lens. The basic theory of the invention may also be applied to linear or line focus lenses. In a linear lens, the grooves would be acylindrical, and all of the grooves together approximate an acylindrical surface, rather than cylindrical as in the prior art.

I claim:

1. A Fresnel lens formed of a material capable of transmitting infrared energy rays, *in the wavelength range from 8 to 14 micrometers,* the lens comprising:

a body, having a grooves surface;

the grooves surface having a plurality of grooves, which extend to the same depth;

the grooves being of different widths; and a substantial portion of the grooves each individually having a surface formed thereon which is entirely aspherical and differs in contour from the surfaces of the other grooves.

2. A Fresnel lens formed of a material capable of transmitting infrared energy rays, *in the wavelength range from 8 to 14 micrometers,* the lens comprising:

a body, having a substantially flat grooved surface;

the grooved surface having a plurality of grooves, each of which extend to the same depth;

the grooves being of different widths; and a substantial portion of the grooves each individually having a surface formed thereon which is entirely aspherical and differs in contour from the surfaces of the other grooves.

*3. The Fresnel lens according to claim 1 wherein the material of the lens is a plastic.*

*4. The Fresnel lens according to claim 1 wherein the material of the lens is polyethylene.*

*5. A Fresnel lens, comprising in combination:*

*A body formed of a polyethylene material capable of transmitting infrared energy rays in the wavelength range from 8 to 14 micrometers, the body having a grooved surface;*

*the grooved surface having a plurality of grooves which extend to the same depth;*

*the grooves being of different widths; and*

*a substantial portion of the grooves each individually having a surface formed thereon which is entirely aspherical and differs in contour from the surface of the other grooves.*

* * * * *